US012752183B2

(12) United States Patent
Koda

(10) Patent No.: US 12,752,183 B2
(45) Date of Patent: Oct. 6, 2026

(54) CONTROLLER

(71) Applicant: Sony Interactive Entertainment Inc., Tokyo (JP)

(72) Inventor: Yuta Koda, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 258 days.

(21) Appl. No.: 18/579,432

(22) PCT Filed: Jul. 21, 2021

(86) PCT No.: PCT/JP2021/027301

§ 371 (c)(1),
(2) Date: Jan. 15, 2024

(87) PCT Pub. No.: WO2023/002596

PCT Pub. Date: Jan. 26, 2023

(65) Prior Publication Data

US 2024/0216794 A1 Jul. 4, 2024

(51) Int. Cl.
*A63F 13/24* (2014.01)

(52) U.S. Cl.
CPC .................................... *A63F 13/24* (2014.09)

(58) Field of Classification Search
CPC .......... A63F 13/20; A63F 13/22; A63F 13/23; A63F 13/24; A63F 2300/1006; A63F 2300/1018; A63F 2300/1056
See application file for complete search history.

(56) References Cited

U.S. PATENT DOCUMENTS 5,675,309 A * 10/1997 DeVolpi ................. G05G 9/047 338/68
6,231,444 B1 * 5/2001 Goto ....................... A63F 13/24 463/37
6,459,420 B1 * 10/2002 Harris ..................... A63F 13/24 D14/416
7,338,374 B2 * 3/2008 Hammond ............ G06F 3/0202 463/36

(Continued)

FOREIGN PATENT DOCUMENTS

JP 2007265278 A 10/2007
JP 2012204062 A 10/2012

(Continued)

OTHER PUBLICATIONS

International Search Report for corresponding PCT Application No. PCT/JP2021/027301, 4 pages, dated Oct. 12, 2021.

*Primary Examiner* — Omkar A Deodhar
(74) *Attorney, Agent, or Firm* — Kilpatrick Townsend & Stockton LLP

(57) ABSTRACT

A controller includes an operating body whose tilting operation is possible, the operating body having a shaft section, a tubular body having an inner surface that is parallel with a longitudinal direction of the shaft section when the tilting operation of the operating body is not performed and that is provided with a gap between the tubular body and the shaft section, and an elastic member that is provided between the tubular body and the shaft section of the operating body and that comes in contact with at least either the inner surface of the tubular body or the shaft section of the operating body when the tilting operation of the operating body is performed.

7 Claims, 7 Drawing Sheets

(56) References Cited

U.S. PATENT DOCUMENTS

| | | | | |
|---|---|---|---|---|
| 7,463,241 | B2 * | 12/2008 | Ushimaru | G05G 9/04796 345/157 |
| 8,044,934 | B2 * | 10/2011 | Arai | G05G 25/04 345/161 |
| 8,869,643 | B2 | 10/2014 | Yamazaki | |
| 9,931,567 | B2 * | 4/2018 | Tiffany | G05G 9/047 |
| 2007/0233289 | A1 | 10/2007 | Arai | |
| 2009/0295724 | A1 * | 12/2009 | Cheng | G05G 9/047 345/161 |
| 2012/0286978 | A1 | 11/2012 | Yamazaki | |
| 2019/0388779 | A1 * | 12/2019 | Morita | A63F 13/214 |

FOREIGN PATENT DOCUMENTS

| | | | |
|---|---|---|---|
| JP | 2014052664 | A | 3/2014 |
| JP | 2018128841 | A | 8/2018 |

* cited by examiner (a)

(b)

CONTROLLER

TECHNICAL FIELD

The present invention relates to a controller whose tilting operation is possible.

BACKGROUND ART

Controllers whose tilting operation is possible have been adopted in a variety of controllers including those of home gaming consoles. In such controllers, an operating body to be operated includes a shaft-shaped member, and a biasing member that supports one end side of the shaft-shaped member and biases the tilting shaft-shaped member in such a manner as to restore the shaft-shaped member to its initial position is provided.

Also, this controller whose tilting operation is possible detects a tilting operation direction and a tilting angle by using a pair of rotation sensors that include members that rotate according to the tilting operation of the operating body including the above shaft-shaped member and arranging rotation axes of the above rotating members of the pair of rotation sensors in question such that the rotation axes are orthogonal to each other.

SUMMARY

Technical Problem

In the above controller of the existing technology, however, resilience that restores the controller to an initial position against tilting operation, that is, a resistive feel to the tilting operation, depends on a biasing force of a biasing member abolished on a support section that supports a shaft-shaped member. For this reason, the resistive feel to the tilting operation is almost constant in any case.

However, there can be users who have a sense of discomfort with the resistive feel provided by the above biasing member. For such users, there has been no means for adjusting the resistive feel of the tilting operation.

Also, even in a case where a user does not have a sense of discomfort with the resistive feel provided by the above biasing member, there is a demand to increase the resistive feel of the tilting operation because of delicate operation required, for example, of controllers of home gaming consoles in games. Such a demand to set the resistive feel to the tilting operation according to a purpose of operation exists not only in home gaming consoles but also across a variety of controllers such as controllers of medical equipment and operation controllers of various mobile bodies.

The present invention has been made in light of the above actual circumstances, and it is an object thereof to provide a controller that enables a user to adjust the resistive feel to the tilting operation.

Solution to Problem

An embodiment of the present invention for solving the problem of the above example of the existing technology is a controller including an operating body whose tilting operation is possible, the operating body having a shaft section and an operating member provided at a tip of the shaft section, a tubular body having an inner surface that is parallel with a longitudinal direction of the shaft section when the tilting operation of the operating body is not performed and that is provided with a gap between the tubular body and the shaft section, and an elastic member provided between the tubular body and the shaft section of the operating body and that comes in contact with at least either the inner surface of the tubular body or the shaft section of the operating body when the tilting operation of the operating body is performed.

Advantageous Effect of Invention

According to the present invention, there is provided the elastic member that comes in contact with at least either the inner surface of the tubular body or the shaft section of the operating body when the tilting operation of the operating body is performed, which makes it possible for a user to adjust a resistive feel to the tilting operation by adjusting the contact position.

DESCRIPTION OF EMBODIMENT

Figure 1:
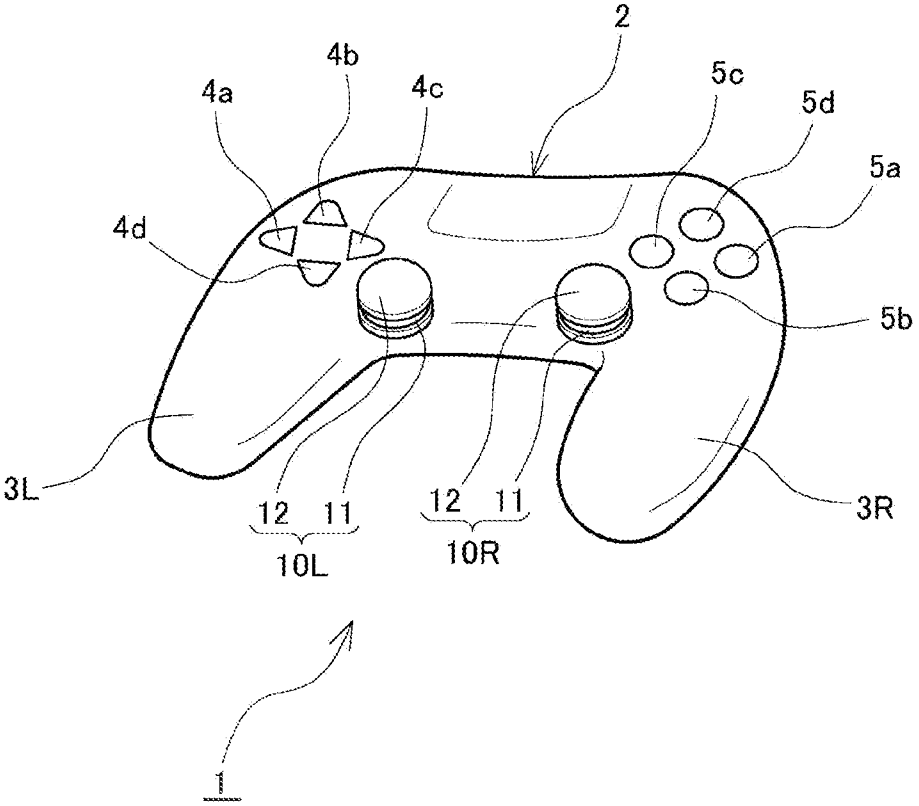
FIG. 1 is a schematic perspective view of a controller according to an embodiment of the present invention.

An embodiment of the present invention will be described with reference to drawings. A controller 1 according to an example of the embodiment of the present invention is, for example, a controller of a home gaming console as illustrated in FIG. 1 and includes a main body section 2, grip sections 3L and 3R formed in such a manner as to extend from both end portions of the main body section 2 toward a front side in directions separating them from each other, buttons 4*a*, 4*b*, 4*c*, and 4*d* provided within a range in which the buttons 4*a*, 4*b*, 4*c*, and 4*d* are operable by fingers of a left hand of a user holding the left grip section 3L, an operating body 10L whose tilting operation is possible, buttons 5*a*, 5*b*, 5*c*, and 5*d* provided within a range in which the buttons 5*a*, 5*b*, 5*c*, and 5*d* are operable by fingers of a right hand of the user holding the right grip section 3R, and an operating body 10R whose tilting operation is possible. FIG. 1 is a perspective view of the controller 1 according to the example of the present embodiment.

It should be noted that, in the controller 1, other buttons such as push buttons, switches, sensors, and the like may be provided, for example, at positions on a back side where they can be operated with index and middle fingers of the left and right hands of the user.

Also, each of the operating bodies 10L and 10R (hereinafter abbreviated as the operating bodies 10 unless it is necessary to distinguish therebetween) includes an operating body 10 whose tilting operation is possible, the operating body 10 including a shaft section 11 and an operating member 12 provided at a tip (one end side) of the shaft section 11.

The other end side of the shaft section 11 of the operating body 10 is supported by a support section that supports the shaft section 11 in a manner that enables tilting operation, and is connected to a detector that detects a tilting angle of each of axial directions orthogonal to each other, in conjunction with the tilting operation. Also, a biasing member is provided on the support section in such a manner as to restore the tilting angle of the shaft section 11 to its initial angle. As the operating body 10 as described above, a known operating body can be adopted, and therefore, a detailed description thereof will be omitted.

The controller 1 is connected wiredly or wirelessly to an information processing apparatus such as a home gaming console and sends, to the information processing apparatus, information indicating nature of operation of the buttons 4*a*, 4*b*, and the like, the operating body 10, and so on by the user. Here, information indicating the nature of operation includes, for example, information indicating the tilting direction and the tilting angle of the operating body 10.

First Example

Figure 2:
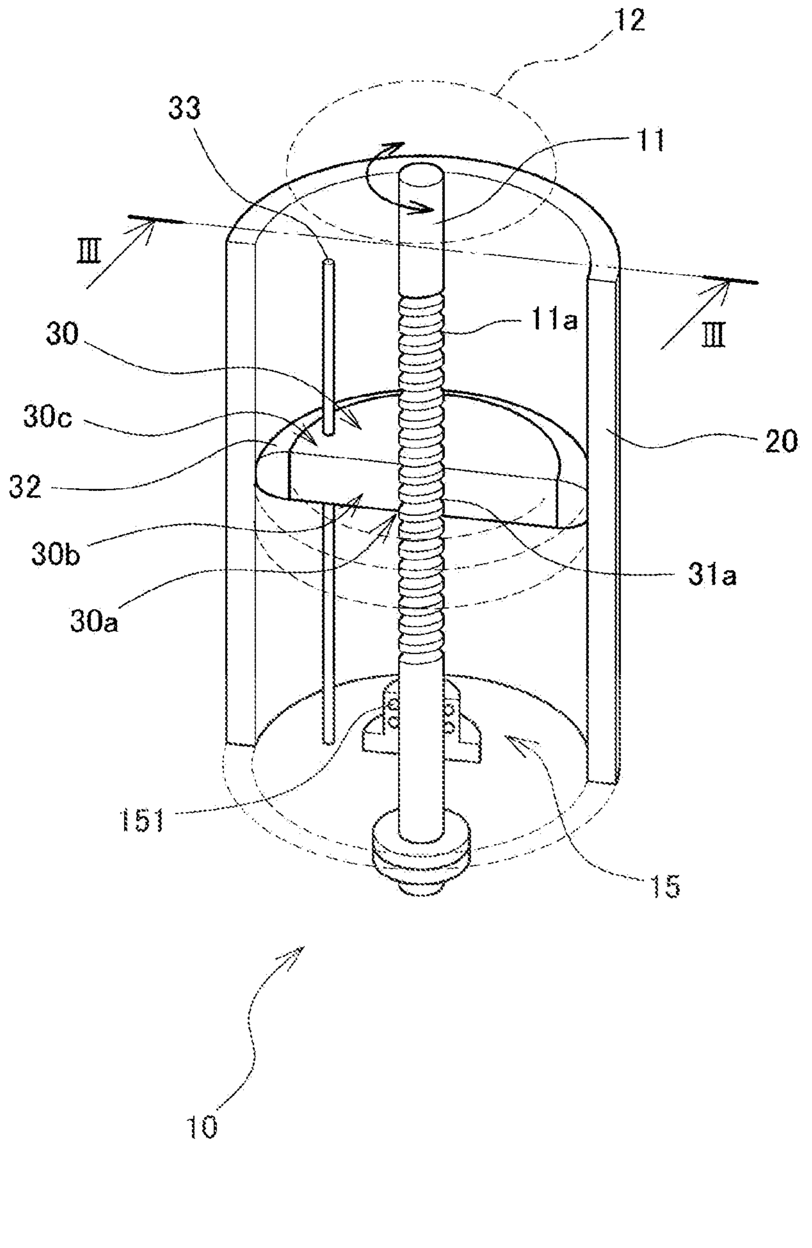
FIG. 2 is a schematic perspective view according to a first example of an operation section of the controller according to the embodiment of the present invention.
Figure 3:
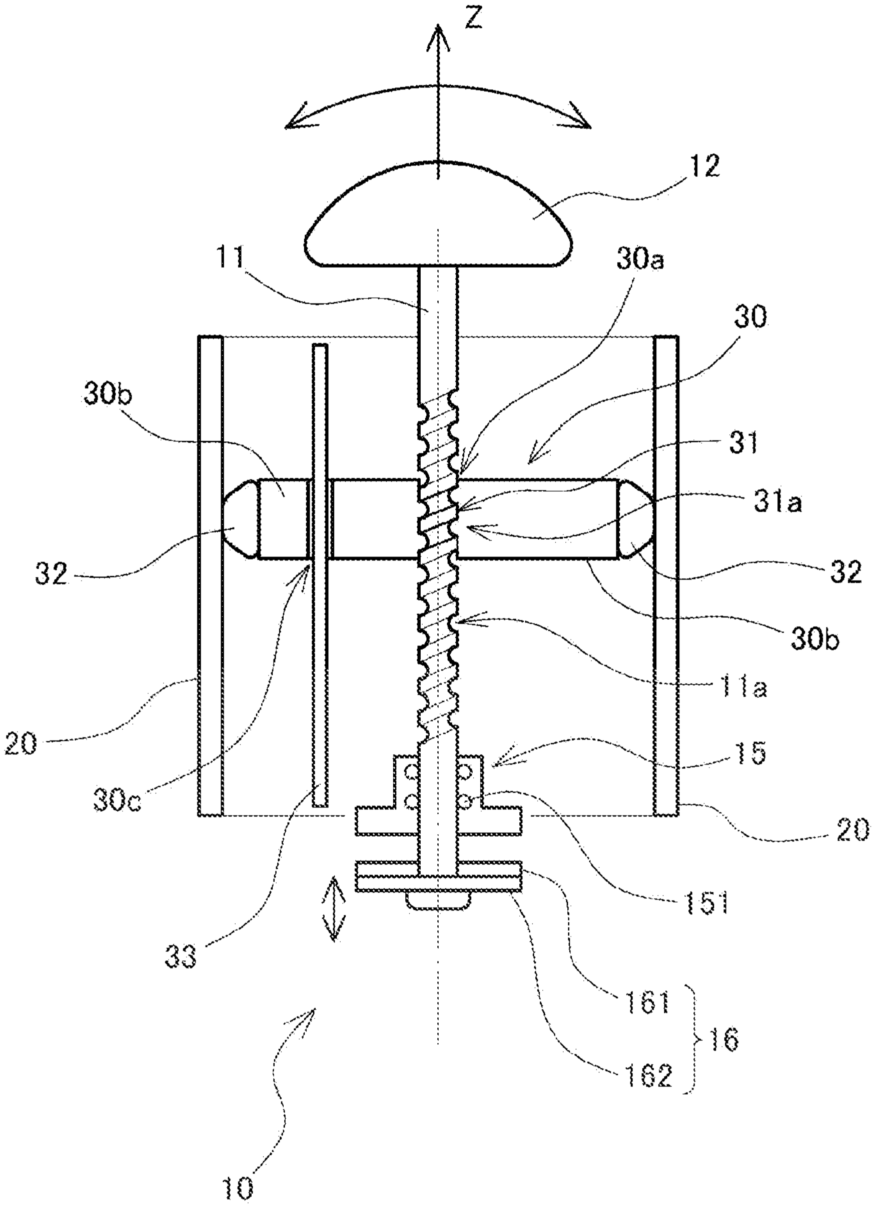
FIG. 3 is a schematic cross-sectional view according to the first example of the operation section of the controller according to the embodiment of the present invention.

Also, in the example of the present embodiment, the shaft section 11 of the operating body 10 is arranged in such a manner as to be inserted into the tubular body 20 provided on a housing of the controller 1 and such that the above one end side projects therethrough outside of the housing as illustrated in FIGS. 2 and 3. FIG. 2 is a schematic perspective view illustrating part of the controller 1 including the tubular body 20 and illustrates, for descriptive purposes, a partial cutaway of the tubular body 20. Also, FIG. 3 is a cross-sectional view obtained by cutting away the controller 1 on a plane including a central axis of the shaft section 11 of the operating body 10. It should be noted that the detector and the like are omitted for ease of viewing in each of the following figures.

As illustrated in FIGS. 2 and 3, the tubular body 20 according to the example of the present embodiment has a hollow cylindrical shape and is provided such that the central axis of the shaft section 11 of the operating body 10 is aligned with a central axis Z of the tubular body 20 in question. That is, the tubular body 20 is arranged such that a longitudinal direction of an inner surface thereof is parallel with the longitudinal direction of the shaft section 11 when tilting operation of the operating body 10 is not performed. Also, the tubular body 20 is provided with a gap from the shaft section 11 to such an extent that the tilting operation of the shaft section 11 is not obstructed.

In the example of the present embodiment, the shaft section 11 of the operating body 10 substantially has a cylindrical shape, and a thread groove 11*a* is formed on at least part thereof. Also, the shaft section 11 of this example is supported rotatably around the central axis by a support section 15. For example, the support section 15 supports the shaft section 11 with a bearing 151 provided on an outer circumference thereof as illustrated in FIG. 3.

Further, the controller 1 of this example has a disk-shaped member 30, and the disk-shaped member 30 includes a disk section 30*b* in which an insertion port 30*a* into which the above shaft section 11 is inserted is formed at the center thereof. A thread groove 31*a* that engages with the thread groove 11*a* of the shaft section 11 of the operating body 10 is formed on an inner circumferential surface 31 of the disk section 30*b* (a wall surface of the insertion port 30*a*).

Also, an outer diameter of the disk section 30*b* is smaller than an inner diameter of the tubular body 20. Further, an elastic member 32 is provided on the outer circumference of the disk section 30*b* of the disk-shaped member 30. The elastic member 32 is, for example, rubber, a spiral spring, or the like, and the outer circumference thereof comes in contact with the inner surface of the tubular body 20 and biases the shaft section 11 in the direction of the center of the tubular body 20 when the tilting operation of the operating body 10 is performed.

Further, on an outer side of the insertion port 30*a* of the disk section 30*b* of the disk-shaped member 30, a through section 30*c* that is formed parallel with the insertion port 30*a* is formed, and a guide shaft 33 that tilts in conjunction with the shaft section 11 is inserted thereinto. The guide shaft 33 extends at least over a length of a movable range of the disk-shaped member 30, which will be described later, along the shaft section 11 and restricts the rotation of the disk-shaped member 30 around the axis of the shaft section 11.

When the shaft section 11 of the operating body 10 is rotated in this state around the axis thereof, the disk-shaped member 30 engaging with the thread groove 31*a* on the outer circumference of the shaft section 11 in question moves in an axially upward or downward direction along the shaft section 11, depending on the rotation direction thereof.

Also, in this example of the present embodiment, a clutch 16 may be provided inside the support section 15 as illustrated in FIG. 3 as securing means that can be set to either the state where the rotation of the shaft section 11 around the rotation axis thereof is permitted or the state where the rotation is restricted. For example, the clutch 16 includes a first clutch plate 161 and a second clutch plate 162. The first clutch plate 161 is provided on the outer circumference of the shaft section 11 on the other end side and moves in conjunction with the rotation of the shaft section 11 around the axis, and the second clutch plate 162 is provided on a housing side of the controller 1, reciprocally moves in the longitudinal direction of the shaft section 11, and can be switched between the state of disengagement from and the state of engagement with the first clutch plate 161.

The user of the controller 1 adjusts a contact position between the elastic member 32 and the shaft section 11 when the tilting operation of the shaft section 11 is performed, by rotating the shaft section 11 of the operating body 10 around the axis and moving the disk-shaped member 30 up and down along the shaft section 11. For example, if this contact position is provided relatively upward on the shaft section 11 (the side close to the operating member 12) (FIG. 4(*a*)), the elastic member 32 comes in contact with the inner surface of the tubular body 20 as a result of the tilting operation at a relatively small angle, and the tilting operation at a greater angle needs to be performed against a biasing force of the elastic member 32, which makes a resistive force to the tilting operation relatively large.

Figure 4:
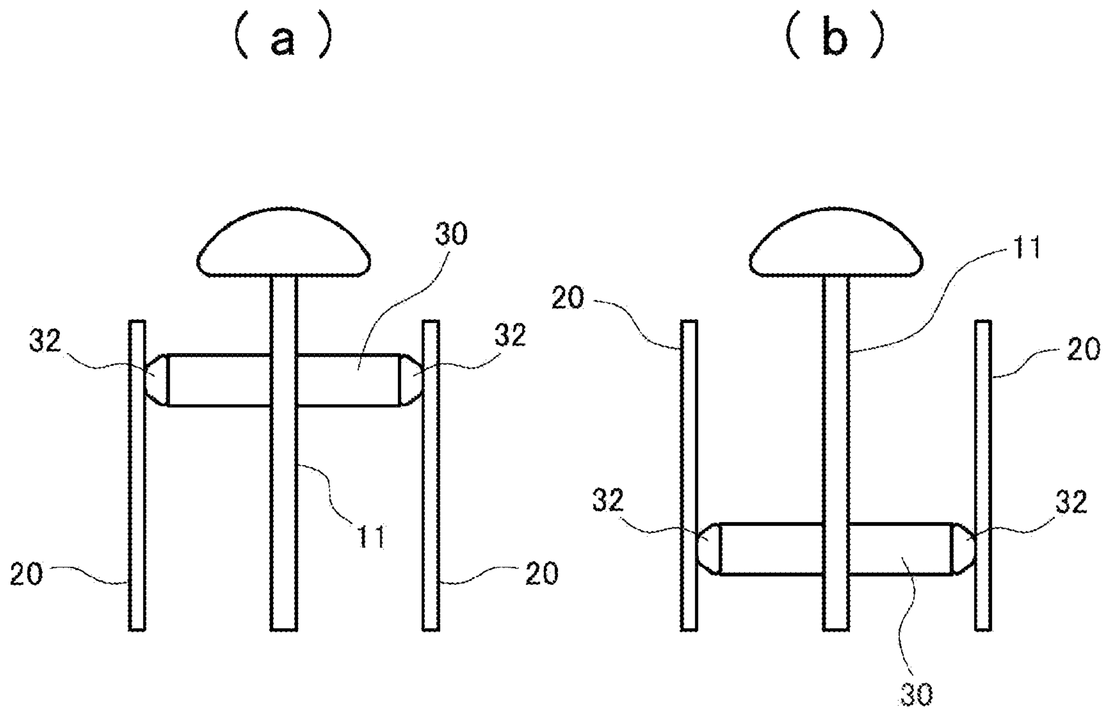
FIG. 4 depicts explanatory views illustrating an operation example of the first example of the operation section of the controller according to the embodiment of the present invention.

Meanwhile, if the user moves the disk-shaped member 30 to the position close to the other end side of the shaft section 11 (the side of the support section 15) by rotating the shaft section 11 (FIG. 4(*b*)), the elastic member 32 does not come in contact with the inner surface of the tubular body 20 until the angle of the tilting operation becomes relatively large. This makes it possible to perform the tilting operation without resisting the biasing force of the elastic member 32 until then, which makes the resistive force to the tilting operation relatively small.

It should be noted that, in a case where the clutch 16 is provided, after the user has rotated the shaft section 11 until the disk-shaped member 30 reaches a desired position, the rotation of the shaft section 11 may be restricted by causing the first and second clutch plates 161 and 162 of the clutch 16 to engage with each other. In this example, it is possible to prevent the resistive force to the tilting operation from changing due to unintentional rotation of the shaft section 11 during the operation of the operating body 10.

Second Example

Also, embodiments of the present invention are not limited to the examples given above. Unlike the first example, an elastic member 32' is provided on an inner circumferential side of a disk-shaped member 30' in the second example of the embodiment of the present invention as illustrated in FIGS. 5 and 6.

Also in this example, the shaft section 11 of the operating body 10 is arranged in such a manner as to be inserted into a tubular body 20' provided on the housing of the controller 1 and such that the above one end side projects therethrough outside of the housing. FIG. 5 is a schematic perspective view illustrating part of the controller 1 according to this second example and illustrates, for descriptive purposes, a partial cutaway of the tubular body 20'. Also, FIG. 6 is a cross-sectional view obtained by cutting away the controller 1 on the plane including the central axis of the shaft section 11 of the operating body 10. It should be noted that the detector and the like are omitted for ease of viewing in each of the figures.

Figure 5:
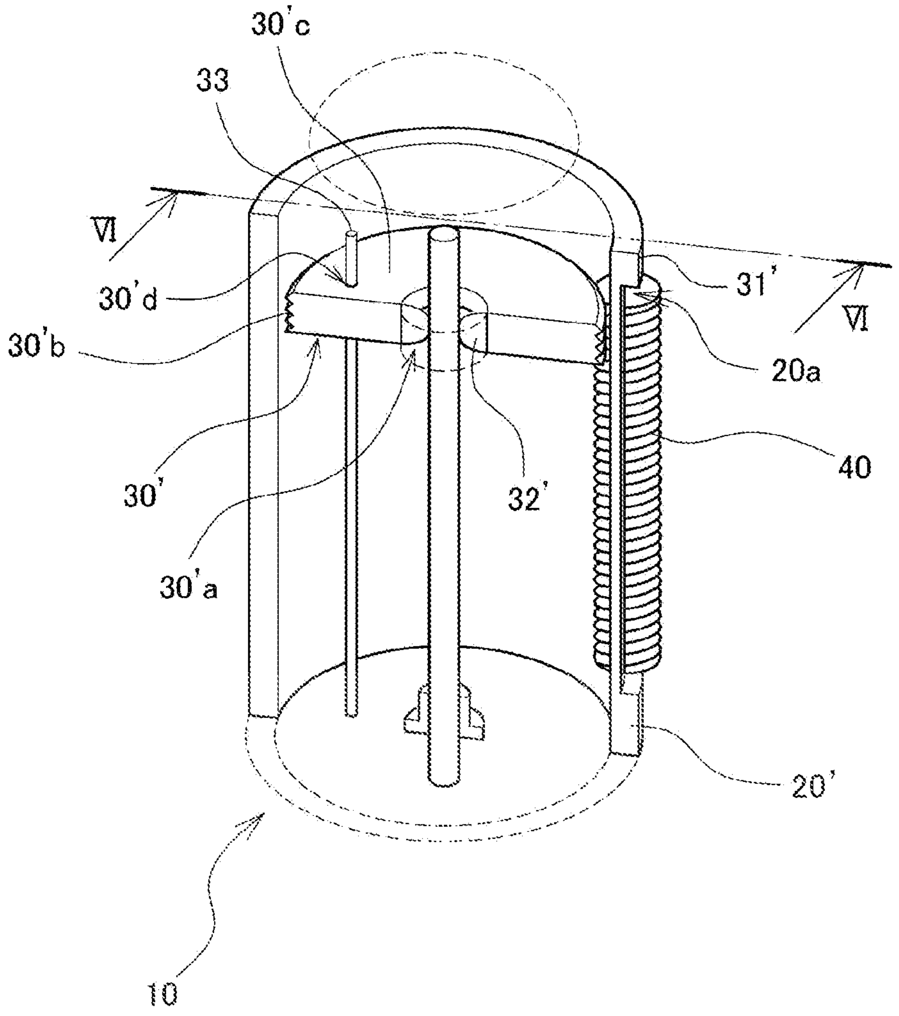
FIG. 5 is a schematic perspective view according to a second example of the operation section of the controller according to the embodiment of the present invention.
Figure 6:
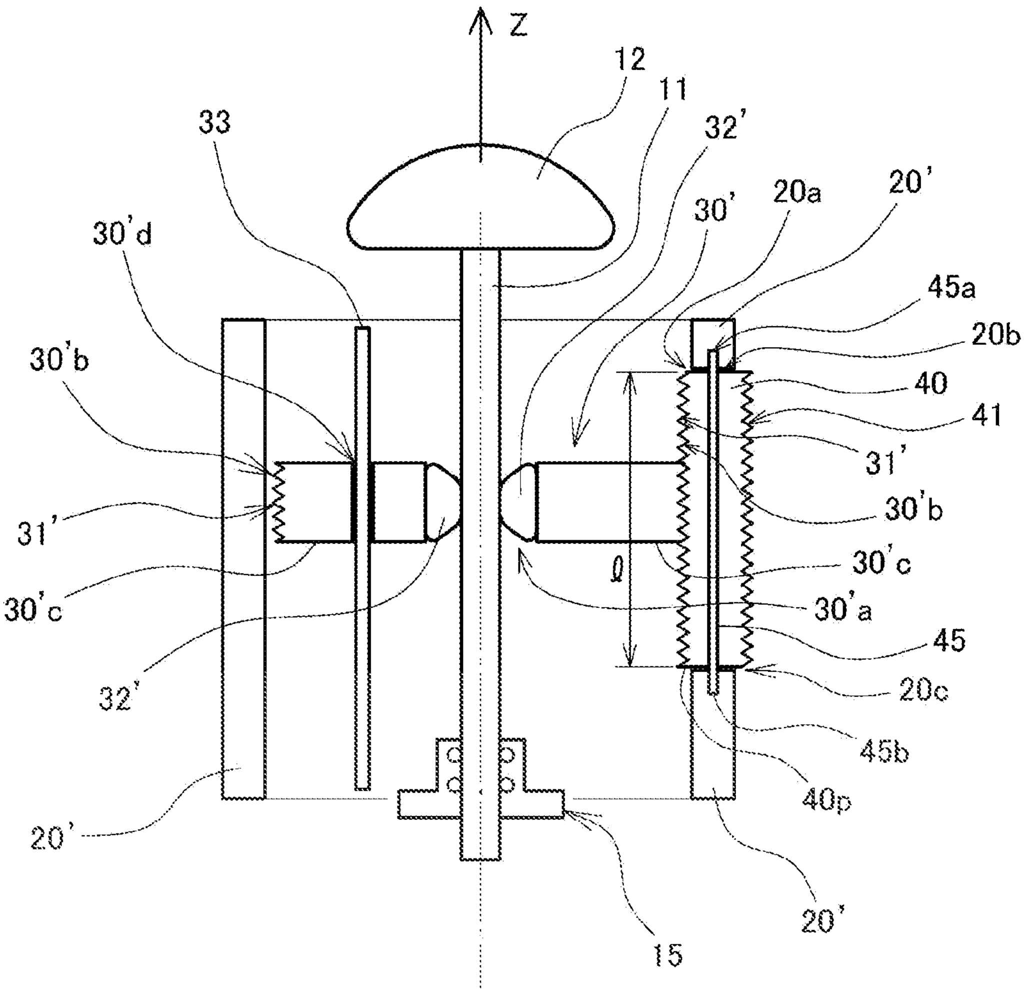
FIG. 6 is a schematic cross-sectional view according to the second example of the operation section of the controller according to the embodiment of the present invention.

As illustrated in FIGS. 5 and 6, the tubular body 20' according to the example of the present embodiment basically has a hollow cylindrical shape. Also, in part of the tubular body 20' of this example, an opening portion **20*a* that is open over a predetermined range in the longitudinal direction of the tubular body 20'** is formed.

Also, in the example of FIGS. 5 and 6, the tubular body 20' is provided such that the central axis Z thereof is aligned with the central axis of the shaft section 11 of the operating body 10. That is, the tubular body 20' is arranged such that the longitudinal direction of the inner surface thereof is parallel with the longitudinal direction of the shaft section 11 when the tilting operation of the operating body 10 is not performed. Also in this example, the tubular body 20' is provided with a gap from the shaft section 11 to such an extent that the tilting operation of the shaft section 11 is not obstructed.

In the example of the present embodiment, the shaft section 11 of the operating body 10 substantially has a cylindrical shape. In this example, it is not necessary to form a thread groove on the shaft section 11, and it is not necessary for the shaft section 11 to be rotatable around the central axis thereof.

A ring-shaped elastic member 32' is provided on an inner circumferential side surface **30'*a* of the disk-shaped member 30' of the controller 1 of this example, and the shaft section 11 is inserted into a ring of the ring-shaped elastic member 32'. A thread groove 31' is formed on an outer circumferential side surface 30'*b* of the disk-shaped member 30'**.

Further, a through section **30'*d* formed parallel with the longitudinal direction (a direction of a generating line) of the disk-shaped member 30' is formed in a disk section 30'*c* of the disk-shaped member 30', and the guide shaft 33 that tilts in conjunction with the shaft section 11 is inserted thereinto. The guide shaft 33 extends at least over the length of the movable range of the disk-shaped member 30' along the shaft section 11 and restricts the rotation of the disk-shaped member 30' around the axis of the shaft section 11**.

Also, in this example of the present embodiment, the controller 1 includes a rotating member 40 that is operably provided, for example, by having part thereof projecting, through the opening portion **20*a* of the above tubular body 20', outside of the tubular body. Here, the rotating member 40 is a member substantially in the shape of a cylinder whose longitudinal direction is parallel with the longitudinal direction of the shaft section 11 and that has a height I spanning the movable range of the disk-shaped member 30'. Also, a thread groove 41 that engages with the thread groove 31' formed on the outer circumferential side surface 30'*b* of the disk-shaped member 30' is formed on the outer circumferential side surface of the rotating member 40. Further, the rotating member 40** is provided rotatably around the central axis thereof.

As an example, a shaft 45 both of whose end portions **45*a* and 45*b* are secured respectively to an upper end 20*b* and a lower end 20*c* of the opening portion 20*a* of the tubular body 20' is inserted into the center of the rotating member 40, and the rotating member 40 is arranged rotatably around the shaft 45. A known method can be adopted regarding an example of arranging the rotating member 40** as described above.

The user of the controller 1 of this example rotates the rotating member 40 around the axis thereof through the opening **20*a* of the tubular body 20'. At this time, the rotation of the disk-shaped member 30' around the shaft section 11 is restricted by the guide shaft 33, which causes the disk-shaped member 30' to move up and down along the shaft section 11. As a result, the user adjusts the contact position between the elastic member 32 and the shaft section 11 when the tilting operation of the shaft section 11** is performed.

Figure 7:
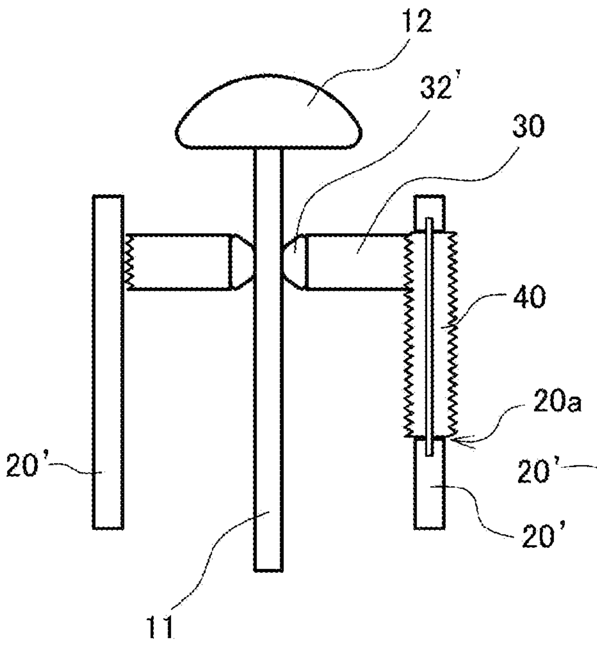
FIG. 7 depicts explanatory views illustrating an operation example of the second example of the operation section of the controller according to the embodiment of the present invention.
Figure 7:
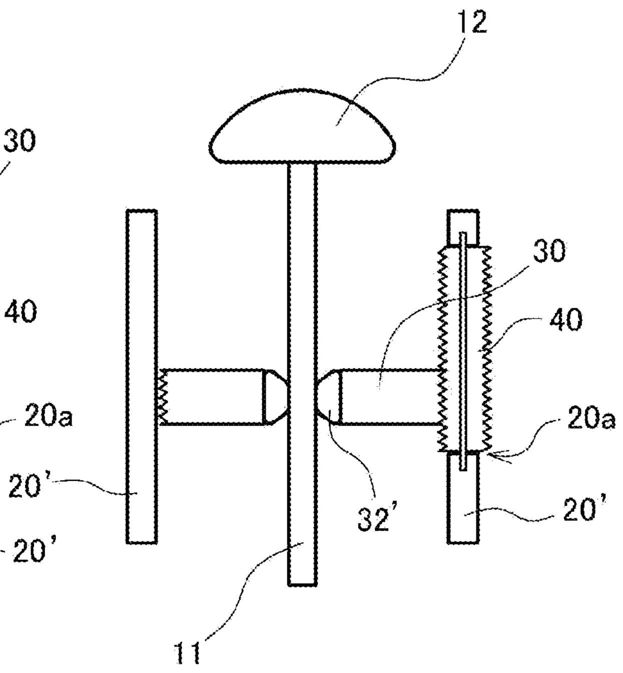

For example, in the state where the position of the disk-shaped member 30' has been moved by operating the rotating member 40 such that this contact position is relatively upward on the shaft section 11 (the side close to the operating member 12) (FIG. 7(*a*)), the elastic member 32 comes in contact with the inner surface of the tubular body 20' as a result of the tilting operation at a relatively small angle, and the tilting operation at a greater angle needs to be performed against the biasing force of the elastic member 32, which makes the resistive force to the tilting operation relatively large.

Meanwhile, if the user moves the disk-shaped member 30' to the position close to the other end side of the shaft section 11 (the side of the support section 15) by rotating the rotating member 40 (FIG. 7(*b*)), the elastic member 32 does not come in contact with the shaft section 11 until the angle of the tilting operation becomes relatively large. This makes it possible to perform the tilting operation without resisting the biasing force of the elastic member 32 until then, which makes the resistive force to the tilting operation relatively small.

Also in this example, after the user has moved the disk-shaped member 30' to the desired position in the longitudinal direction of the shaft section 11 by operating the rotating member 40, the rotation of the rotating member 40 may be restricted to prevent that position from moving because of the operation of the operating body 10.

As for this rotation restriction method, for example, a clutch that can mesh with a bottom portion 40*p* of the rotating member 40 may be provided such that the rotating member 40 is set to either the state where the rotation of the rotating member 40 is permitted or the state where the rotation in question is restricted.

Third Example

In the present embodiment, it is only necessary to change the positions of the disk-shaped members 30 and 30' relative to the shaft section 11, and in the first and second examples described so far, the disk-shaped members 30 and 30' are moved along the shaft section 11 by means of threaded engagement with the shaft section 11 or the rotating member 40 and the rotation thereof.

Figure 8:
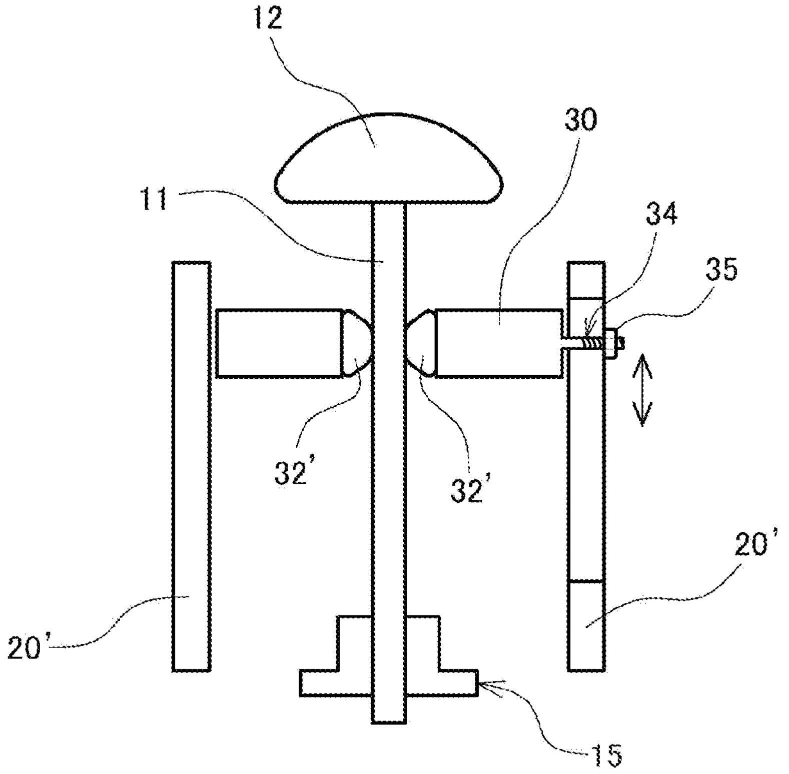
FIG. 8 is a schematic cross-sectional view according to a third example of the operation section of the controller according to the embodiment of the present invention.

However, the present embodiment is not limited thereto. For example, as illustrated in FIG. 8, a projecting portion 34 that can be operated from outside of the tubular body 20' through the opening 20*a* of the above tubular body 20' may be formed on the outer circumference of the disk-shaped member 30' of the second example. In this case, the rotating member 40 is not provided. Also, the guide shaft 33 is not always necessary either.

Also in this example, the shaft section 11 of the operating body 10 is arranged in such a manner as to be inserted into the tubular body 20' provided on the housing of the controller 1 and such that the above one end side projects therethrough outside of the housing. FIG. 8 is a cross-sectional view obtained by cutting away the controller 1 on the plane including the central axis of the shaft section 11 of the operating body 10. It should be noted that the detector and the like are also omitted for ease of viewing in this figure.

The user of the controller 1 of this example moves the disk-shaped member 30' to the desired position by moving the projecting portion 34 formed on the outer circumference of the disk-shaped member 30', along the longitudinal direction of the shaft section 11 through the opening 20*a* of the tubular body 20'.

It should be noted that, in this example, it is sufficient if the opening 20*a* of the tubular body 20' is a slit-shaped opening because it is only necessary for the projecting portion 34 to project only to the position where the projecting portion 34 can be operated.

Also in this example, after the user has moved the disk-shaped member 30' to the desired position in the longitudinal direction of the shaft section 11, the movement of the disk-shaped member 30' from the position in question may be restricted. In this example, because it is only necessary to keep the position of the above projecting portion 34 unchanged, the projecting portion 34 may be securable to the tubular body 20' with a screw 35 or the like at the desired position, for example. In this case, a thread groove that meshes with the screw 35 is formed on the outer circumference of the projecting portion 34 in advance such that, in the state where the screw 35 meshes with the thread groove, the projecting portion 34 can move between the state where the movement of the projecting portion 34 is permitted (the state where the screw 35 is loosened) and the state where the movement of the projecting portion is restricted (the state where the projecting portion 34 is secured to the tubular body 20' with the screw 35). In this example of the present embodiment, the screw 35 corresponds to an example of securing means.

Modification Example

Also, although, in the description given so far, the shaft section 11 of the first example and the rotating member 40 of the second example are manually rotated by the user, the present embodiment is not limited to this example. For example, the position of the disk-shaped member 30 or 30' may be moved along the longitudinal direction of the shaft section 11 by obtaining, while rotating the shaft section 11 or the rotating member 40 with a motor (e.g., a stepping motor), a rotation angle thereof with a rotary encoder and electrically controlling an amount of rotation thereof.

Further, in the third example, the position of the disk-shaped member 30' in question may be also moved along the longitudinal direction of the shaft section 11 by electrically controlling the disk-shaped member 30' with a linear actuator.

In the case of this example, a processor included in the controller 1 may determine a rotation angle by the motor or a movement direction and an amount of movement by the linear actuator in accordance with instructions from the information processing apparatus connected to the controller 1 and control the motor or the linear actuator.

Alternatively, the processor included in the controller 1 may receive, from the information processing apparatus, information associated with the rotation angle by the motor or the movement direction and the amount of movement by the linear actuator determined by the user operation and control the motor or the actuator in accordance with the information in question.

Further, the controller 1 may obtain information indicating the amount of rotation (i.e., the position of the disk-shaped member 30 or 30') of the shaft section 11 or the rotating member 40 manually operated by the user and send the information to the information processing apparatus. In this case, the information processing apparatus retains this information and send the retained information in question to the controller 1 in response to a user instruction. The controller 1 receives the information in question sent by the information processing apparatus in question and reproduces the position of the disk-shaped member 30 or 30' by controlling the motor or the linear actuator in accordance with the information in question and rotating the shaft section 11 or the rotating member 40.

It should be noted that, in this example of the present embodiment, it is not always necessary to manually rotate the rotating member 40 in the second example, for example, and therefore, it is not always necessary for the tubular body 20' to include the opening 20*a* and the like. Similarly, also in the third example, the projecting portion 34 is not always necessary, and it is not necessary for the tubular body 20' to include the opening 20*a*.

[Presentation of Clicking Feel]

Also, a clicking feel may be presented when the shaft section 11 or the rotating member 40 is rotated, by providing a plurality of protruding portions that project in an outer horizontal direction on a peripheral portion of the outer circumference of the shaft section 11 or the rotating member 40 and configuring them such that a plate spring or the like meshes between the pair of protruding portions periodically in accompaniment with the rotation. Similarly, by forming the plurality of protruding portions in the vicinity of a movement path of the projecting portion 34 on a lateral edge of the opening 20*a* of the tubular body 20', a clicking feel may be presented as a result of intermittent contact of the projecting portion 34 with the protruding portions when the projecting portion 34 is moved. It should be noted that a configuration for presenting a clicking feel is not limited to these examples and that a variety of known methods can be adopted.

[Graduations]

Also, graduations that roughly indicate the amount of rotation or the amount of movement may be provided on the outer circumference of the shaft section 11 or the rotating member 40 or on the outer circumference of the tubular body 20'. For example, if, in the third example, the graduations are formed on the outer circumference of the tubular body 20' along the movement direction of the projecting portion 34, it is possible for the user to reproduce a past operation feel by memorizing a graduation position of the projecting portion 34 at the time of the past movement and moving the projecting portion 34 to the memorized position in question.

[Advantageous Effect of the Embodiment]

According to the present embodiment, an operating body whose tilting operation is possible includes a shaft section, and a tubular body having an inner surface that is parallel with a longitudinal direction of the shaft section when the tilting operation is not performed is provided with a gap between the tubular body and the shaft section in question to such an extent that the tilting operation is not obstructed. Also, this operating body movably supports, between the tubular body in question and the shaft section of the operating body, an elastic member that comes in contact with at least either the inner surface of the tubular body or the shaft section of the operating body along the above shaft section when the tilting operation of the operating body is performed. This makes it possible to adjust a resistive feel to the tilting operation of the operating body by adjusting a position of the elastic member. Also, in the examples of the present embodiment, it is possible to continuously adjust the position, which makes it possible to linearly change the resistive feel to the tilting operation by moving the position of the elastic member in question.

REFERENCE SIGNS LIST

1: Controller
2: Main body section
3: Grip section
4, 5: Button
10: Operating body
11: Shaft section
12: Operating member
15: Support section
16: Clutch
20, 20': Tubular body
30, 30': Disk-shaped member
32, 32': Elastic member
33: Guide shaft
34: Projecting portion
35: Screw
40: Rotating member

The invention claimed is:

1. A controller comprising:

an operating body configured to permit a tilting operation, the operating body having a shaft section and an operating member provided at a tip of the shaft section;

a tubular body having an inner surface that is parallel with a longitudinal direction of the shaft section when the tilting operation of the operating body is not performed and that is provided with a gap between the tubular body and the shaft section; and an elastic member that is provided between the tubular body and the shaft section of the operating body and that comes in contact with at least either the inner surface of the tubular body or the shaft section of the operating body when the tilting operation of the operating body is performed, wherein:

the shaft section of the operating body has a cylindrical shape, including a first thread groove formed on at least part thereof, the controller includes: (i) a disk-shaped member having a second thread groove, the second thread groove being formed on an inner circumferential surface of the disk-shaped member and engaging with the first thread groove of the shaft section, the disk-shaped member being adapted to be movable along the longitudinal direction of the shaft section by rotation of the shaft section around a longitudinal axis, and (ii) a securing mechanism adapted to be set to either a state where the rotation of the shaft section of the operating body around the longitudinal axis is permitted or a state where the rotation in question is restricted, and the elastic member is provided on an outer circumference of the disk-shaped member and adapted to come in contact with the inner surface of the tubular body when the tilting operation of the operating body is performed.

2. The controller according to claim 1, comprising:

a support adapted to movably support the elastic member along the shaft section; and a securing mechanism adapted to restrict movement of the elastic member and secure the elastic member at a desired position along the shaft section.

3. The controller according to claim 1, comprising:

a disk-shaped member in a hollow cylindrical shape whose outer diameter is capable of being accommodated in an inner diameter of the tubular body, the disk-shaped member having a thread groove formed on an outer circumference surface thereof and having the elastic member provided on an inner surface, the shaft section of the operating body being inserted into the inner diameter of the tubular body, a rotating member that has a thread groove which engages with the thread groove on the outer circumference surface of the disk-shaped member and that is adapted to be rotatably supported around an axis parallel with a longitudinal axis of the disk-shaped member and move the disk-shaped member along the longitudinal direction of the shaft section by means of the rotation in question, and a securing mechanism adapted to be set to either a state where the rotation of the rotating member is permitted or a state where the rotation in question is restricted, wherein the elastic member provided on the inner surface of the disk-shaped member comes in contact with the shaft section of the operating body when the tilting operation of the operating body is performed.

4. The controller according to claim 1, comprising:

a plate-shaped member in a hollow cylindrical shape whose size is capable of being accommodated in an inner diameter of the tubular body, the plate-shaped member having the elastic member provided on an inner surface, the shaft section of the operating body being inserted into the inner diameter of the tubular body, the plate-shaped member having a projecting portion that is provided on an outer circumference surface of the plate-shaped member and that projects outside of the tubular body, and a securing mechanism adapted to be set to either a state where movement of the projecting portion is permitted or a state where the movement of the projecting portion is restricted, wherein the elastic member provided on the inner surface of the plate-shaped member comes in contact with the shaft section of the operating body when the tilting operation of the operating body is performed.

5. A controller comprising:

an operating body configured to permit a tilting operation, the operating body having a shaft section and an operating member provided at a tip of the shaft section;

a tubular body having an inner surface that is parallel with a longitudinal direction of the shaft section when the tilting operation of the operating body is not performed and that is provided with a gap between the tubular body and the shaft section;

an elastic member that is provided between the tubular body and the shaft section of the operating body and that comes in contact with at least either the inner surface of the tubular body or the shaft section of the operating body when the tilting operation of the operating body is performed;

a disk-shaped member in a hollow cylindrical shape whose outer diameter is capable of being accommodated in an inner diameter of the tubular body, the disk-shaped member having a thread groove formed on an outer circumference surface thereof and having the elastic member provided on an inner surface, the shaft section of the operating body being inserted into the inner diameter of the tubular body;

a rotating member that has a thread groove which engages with the thread groove on the outer circumference surface of the disk-shaped member and that is adapted to be rotatably supported around an axis parallel with a longitudinal axis of the disk-shaped member and move the disk-shaped member along the longitudinal direction of the shaft section by means of the rotation in question; and a securing mechanism adapted to be set to either a state where the rotation of the rotating member is permitted or a state where the rotation in question is restricted, wherein the elastic member provided on the inner surface of the disk-shaped member comes in contact with the shaft section of the operating body when the tilting operation of the operating body is performed.

6. The controller of claim 5, further comprising:

a support adapted to movably support the elastic member along the shaft section; and a securing mechanism adapted to restrict movement of the elastic member and secure the elastic member at a desired position along the shaft section.

7. The controller of claim 5, further comprising:

a plate-shaped member in a hollow cylindrical shape whose size is capable of being accommodated in an inner diameter of the tubular body, the plate-shaped member having the elastic member provided on an inner surface, the shaft section of the operating body being inserted into the inner diameter of the tubular body, the plate-shaped member having a projecting portion that is provided on an outer circumference surface of the plate-shaped member and that projects outside of the tubular body, and a securing mechanism adapted to be set to either a state where movement of the projecting portion is permitted or a state where the movement of the projecting portion is restricted, wherein the elastic member provided on the inner surface of the plate-shaped member comes in contact with the shaft section of the operating body when the tilting operation of the operating body is performed.

* * * * *